(12) United States Patent
Lim et al.

(10) Patent No.: US 10,840,508 B2
(45) Date of Patent: Nov. 17, 2020

(54) LITHIUM ION SECONDARY BATTERY

(71) Applicant: SK INNOVATION CO., LTD., Seoul (KR)

(72) Inventors: Jin-Sub Lim, Daejeon (KR); Kook-Hyun Han, Daejeon (KR); Duck-Chul Hwang, Gyeonggi-do (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 16/230,697

(22) Filed: Dec. 21, 2018

(65) Prior Publication Data

US 2019/0148724 A1  May 16, 2019

Related U.S. Application Data

(63) Continuation of application No. 14/941,118, filed on Nov. 13, 2015, now Pat. No. 10,170,760.

(30) Foreign Application Priority Data

Nov. 14, 2014 (KR) .................. 10-2014-0158679

(51) Int. Cl.
*H01M 4/485* (2010.01)
*H01M 4/525* (2010.01)
*H01M 4/505* (2010.01)
*H01M 4/62* (2006.01)

(52) U.S. Cl.
CPC .......... *H01M 4/485* (2013.01); *H01M 4/505* (2013.01); *H01M 4/525* (2013.01); *H01M 4/625* (2013.01)

(58) Field of Classification Search
CPC ...... H01M 4/485; H01M 4/505; H01M 4/525; H01M 4/625
See application file for complete search history.

(56) References Cited

U.S. PATENT DOCUMENTS

| | | | |
|---|---|---|---|
| 2010/0230641 A1* | 9/2010 | Oki | H01M 4/131 252/502 |
| 2014/0027670 A1* | 1/2014 | Sun | H01M 4/483 252/182.1 |

* cited by examiner

*Primary Examiner* — Jimmy Vo
(74) *Attorney, Agent, or Firm* — IP & T Group LLP

(57) ABSTRACT

Provided is a secondary battery, specifically, a secondary battery having excellent stability and improved output characteristic and low temperature characteristic by including a cathode active material in which at least one of metals forming the cathode active material has a concentration gradient in an entire region from a central portion up to a surface portion; and a conductive material mixture in which carbon nanotube is mixed with carbon black at an appropriate ratio, the carbon black being a spherical nanoparticle.

14 Claims, No Drawings

LITHIUM ION SECONDARY BATTERY

TECHNICAL FIELD

The present disclosure relates to a secondary battery, specifically, to a secondary battery having excellent stability and improved output characteristic and low temperature characteristic by including a cathode active material in which at least one of metals forming the cathode active material has a concentration gradient in an entire region from a central portion up to a surface portion; and a conductive material mixture in which carbon nanotube is mixed with carbon black at an appropriate ratio, the carbon black being a spherical nanoparticle.

BACKGROUND ART

Nowadays, a lithium secondary battery has been widely used in portable mobile devices such as cell phones, and laptop computers. In addition, the lithium secondary battery has received attention as a medium- or large-sized battery system for power storage of renewable energy such as solar and wind power, and the like, as well as power sources of hybrid electric vehicles and intelligent robots.

The lithium secondary battery uses a principle in which electrical energy is generated by a change in chemical potential when lithium ions are inserted into and desorbed from a cathode and an anode.

The lithium secondary battery is manufactured by including materials capable of reversibly inserting and desorbing lithium ions as a cathode active material and an anode active material, and filling an organic electrolyte or a polymer electrolyte between the cathode and the anode.

In particular, a lithium composite metal compound has been used as the cathode active material of the lithium secondary battery. For example, composite metal oxides such as $LiCoO_2$, $LiMn_2O_4$, $LiNiO_2$, $LiNi_{1-x}Co_xO_2$ (0<x<1), $LiMnO_2$, $LiFePO_4$, and the like, have been researched so far.

Among the examples, since $LiCoO_2$ is significantly useful as the cathode active material for a secondary battery due to stable charge and discharge characteristics, excellent electron conductivity, high battery voltage, high stability, and flat discharge voltage characteristics, but has a unstable crystal structure due to lithium elimination during charging, which significantly deteriorates thermal characteristics.

In order to overcome the drawback, Korean Laid-Open Publication Nos. 005-0083869, 2007-0097923 suggested a lithium transition metal oxide in which metal composition has a concentration gradient, as a cathode active material for a secondary battery. However, due to a large internal resistance, the lithium transition metal oxide has lower output characteristic than that of the existing cathode active materials.

DISCLOSURE

Technical Problem

An aspect of the present disclosure is to provide to a secondary battery having excellent stability and improved output characteristic and low temperature characteristic by including a cathode active material having a concentration gradient in an entire region from a central portion up to a surface portion, and further including specific conductive materials mixed at an appropriate ratio.

Specifically, the present disclosure is directed to providing a secondary battery having excellent stability and improved output characteristic and low temperature characteristic by including a cathode active material in which at least one of metals forming the cathode active material has a concentration gradient in an entire region from a central portion up to a surface portion; and a conductive material mixture in which carbon nanotube is mixed with carbon black which is a spherical nanoparticle, in a cathode mixture used in the secondary battery of the present disclosure.

However, technical problems to be achieved in the present disclosure are not limited to the above-mentioned problems, and other problems will be clearly understood to those skilled in the art from the following descriptions.

Technical Solution

In accordance with one aspect of the present disclosure, there is provided a secondary battery having excellent stability and improved output characteristic and low temperature characteristic by including a cathode active material in which at least one of metals forming the cathode active material has a concentration gradient in an entire region from a central portion up to a surface portion; and a conductive material mixture in which carbon nanotube is mixed with carbon black which is a spherical nanoparticle.

Advantageous Effects

According to the cathode mixture for a secondary battery according to the present disclosure, the secondary battery having excellent stability and improved output characteristic and low temperature characteristic may be provided by including a cathode active material having a concentration gradient in an entire region from a central portion up to a surface portion, and further including specific conductive materials mixed at an appropriate ratio.

That is, the specific conductive materials mixed at an appropriate ratio are also used with the cathode active material, such that a conductive path between the cathode active material and the conductive materials may be smoothly formed to improve output characteristic and low temperature characteristic.

BEST MODE

Hereinafter, exemplary embodiments of the present disclosure will be described in detail with reference to the accompanying drawings so that they can be easily carried out by those skilled in the art. The present disclosure may be implemented in various different ways and is not limited to the exemplary embodiments provided in the present description.

Hereinafter, the present disclosure will be described in detail.

According to an exemplary embodiment of the present disclosure, there is provided a secondary battery having excellent stability and improved output characteristic and low temperature characteristic by including a cathode active material in which at least one of metals forming the cathode active material has a concentration gradient in an entire region from a central portion up to a surface portion; and a conductive material mixture in which carbon nanotube is mixed with carbon black which is a spherical nanoparticle.

That is, according to the cathode mixture for a secondary battery according to the present disclosure, the secondary battery having excellent stability and improved output characteristic and low temperature characteristic may be provided by including a cathode active material having a concentration gradient in an entire region from a central portion up to a surface portion, and further including a conductive material mixture in which specific conductive materials are mixed at an appropriate ratio. To this end, the conductive material mixture of the present disclosure may include carbon nanotube and carbon black.

In order to achieve effect contact between the conductive materials and the active material to excellently form a conductive path between the active materials, it is important to select kinds and mixing ratio of the conductive materials constituting the conductive material mixture.

First, the conductive material mixture preferably includes carbon black which is a nanoparticle as a first conductive material. The carbon black has an approximately spherical shape, and is mixed with carbon nanotube (CNT) as a second conductive material, thereby achieving effective contact between the conductive materials and the active material. The conductive material mixture preferably includes CNT as the second conductive material.

That is, in the present disclosure, the first conductive material included in the conductive material mixture has an approximately spherical shape, and the second conductive material has a linear shape formed in a cylinder structure, such that when the first conductive material and the second conductive material are employed as components of conductive material mixture of the present disclosure, a pore formation rate is minimized, and accordingly, the conductive path between the conductive materials and the active material may be easily formed. Accordingly, there is provided a secondary battery having excellent stability and improved output characteristic and low temperature characteristic.

Here, the first conductive material and the second conductive material included in the conductive material mixture are mixed at a mixing ratio of 10:0.1 to 1:10, particularly, 10:1 to 6:4.

When the mixing ratio of the second conductive material to the first conductive material is less than 1 wt %, the content of the second conductive material is not sufficient, such that an effect of improving the output characteristic and the low temperature characteristic of the secondary battery is not exhibited. When the mixing ratio of the second conductive material to the first conductive material is more than 60 wt %, an excessive amount of the second conductive material increases a pore formation rate between the conductive materials and the active material, such that a conductive path between the conductive materials and the active material is not excellently formed, which deteriorates the output characteristic and the low temperature characteristic of the secondary battery.

Meanwhile, the cathode active material is represented by Chemical Formula 1 below, and in Chemical Formula 1, at least one of M1, M2, and M3 has a continuous concentration gradient from the central portion up to the surface portion:

$$Li_xM1_aM2_bM3_cO_y$$ [Chemical Formula 1]

in Chemical Formula 1,

M1, M2 and M3 are selected from the group consisting of Ni, Co, Mn, Na, Mg, Ca, Ti, V, Cr, Cu, Zn, Ge, Sr, Ag, Ba, Zr, Nb, Mo, Al, Ga and B, and 0<$x$≤1.1, 2≤$y$≤2.02, 0≤$a$≤1, 0≤$b$≤1, 0≤$c$≤1, 0<$a+b+c$≤1.

That is, the cathode active material of the present disclosure has a concentration gradient in which a concentration of some of metals is continuous in the entire region from the central portion up to the surface portion of the particle, unlike the conventional cathode active materials having a concentration gradient in which a concentration of metals is uniform in an internal area of the cathode active material and the concentration of metals is gradual only in an external area thereof.

Specifically, at least one of M1, M2, and M3 may have a concentration gradient region in which a concentration is increased from the central portion up to the surface portion, and the remainder may have a concentration gradient region in which a concentration is decreased from the central portion up to the surface portion.

Preferably, in the cathode active material of the present disclosure, a concentration of one of metals forming the cathode active material is uniform in the entire region from the central portion up to the surface portion of the particle, and concentrations of other two metals are increased or decreased in the entire region from the central portion up to the surface portion of the particle, respectively, while having a continuous concentration gradient.

Any one of M1, M2, and M3 may have a predetermined concentration from the central portion up to the surface portion, and another one may have a concentration gradient region in which a concentration is increased from the central portion up to the surface portion, and the other one may have a concentration gradient region in which a concentration is decreased from the central portion up to the surface portion.

Specifically, M1 may be Ni, M2 may be Mn, and M3 may be Co.

In the present disclosure, the metal of the lithium-metal oxide has the continuous concentration gradient from the central portion up to the surface portion, which means that a metal except for lithium has a concentration distribution in which concentration is changed in a certain tendency from the central portion up to the surface portion of the lithium-metal oxide particle. The certain tendency means that overall concentration change trend is decreased or increased, but does not exclude values at some points being opposite to this trend. In the present disclosure, the central portion of the particle means a portion within a radius of 0.2 μm from the center of the active material particle, and the surface portion of the particle means a portion within a radius of 0.2 μm from the outermost of the particle.

Preferably, the slope of the concentration gradient in the present disclosure is uniform from the central portion up to the surface portion of the particle, that is, the concentration is uniformly changed.

The cathode active material particle according to the present disclosure may include a relatively large content of nickel (Ni). Nickel is used to improve battery capacity. In the conventional cathode active material structure, when the content of nickel is large, lifespan is deteriorated. However, in the case of the cathode active material according to the present disclosure, even though the content of nickel is large, lifespan is not deteriorated. Accordingly, the cathode active material of the present disclosure may exhibit excellent lifespan characteristic while maintaining high capacity.

For example, in the cathode active material particle according to the present disclosure, a molar ratio of nickel may be 0.6 to 0.9, preferably, 0.7 to 0.9. That is, when M1 is Ni in Chemical Formula 1 above, 0.6≤$a$≤0.95 and 0.05≤$b+c$≤0.4, preferably, 0.7≤$a$≤0.9 and 0.1≤$b+c$≤0.3, may be satisfied.

The cathode active material particle according to the present disclosure is not specifically limited in view of a particle shape, but preferably, a primary particle may have a rod-type shape.

The cathode active material particle according to the present disclosure is not specifically limited in view of a particle size. For example, the cathode active material particle may have a particle size of 3 to 20 μm.

Meanwhile, the content of the cathode active material and the conductive material mixture in the present disclosure is preferably 2 to 8 parts by weight (wt %), more preferably, 3 to 5 parts by weight (wt %) relative to 100 parts by weight (wt %) of the cathode active material.

The present disclosure provides a cathode including the cathode active material and the conductive material mixture, wherein the cathode may be effectively used for a cathode of an electrochemical cell such as a secondary battery. The secondary battery includes an anode including an anode active material and an electrolyte, together with the cathode.

The cathode includes a current collector and a cathode layer formed on the current collector.

The cathode may include a binder in addition to the above-described cathode and the conductive material mixture. The binder serves to excellently attach cathode active material particles to each other, and excellently attach the cathode active material to a current collector. Representative examples of the binder may include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like. However, the present disclosure is not limited to the above-described binders.

The current collector may be aluminum (Al), but the present disclosure is not limited thereto.

The anode includes a current collector and an anode active material layer formed on the current collector, wherein the anode active material layer includes an anode active material. The anode active material includes a material capable of reversibly inserting and desorbing lithium ions, a material capable of doping and de-doping lithium metals, lithium metal alloys, lithium, or a transition metal oxide.

The material capable of reversibly inserting and desorbing lithium ions is a carbon material, wherein the carbon material may be any carbon-based anode active material generally used in a lithium ion secondary battery, and representative examples of the carbon-based anode active material may include crystalline carbon, amorphous carbon, or combinations thereof. Examples of the crystalline carbon may include amorphous, plate-shaped, flaky, spherical or fibrous natural graphite or artificial graphite. Examples of the amorphous carbon may include soft carbon (low temperature fired carbon), hard carbon, mesophase pitch carbide, fired cokes, and the like.

The lithium metal alloys may be alloys of lithium with a metal such as Na, K, Rb, Cs, Fr, Be, Mg, Ca, Sr, Si, Sb, Pb, In, Zn, Ba, Ra, Ge, Al or Sn.

The material capable of doping and de-doping lithium may be Si, $SiO_x$ ($0<x<2$), Si-M alloy (wherein M is an alkali metal, an alkaline earth metal, Group 13 to 16 element, a transition metal, a rare earth element or combinations thereof, excluding Si), Sn, $SnO_2$, Sn-M (wherein M is an alkali metal, an alkaline earth metal, Group 13 to 16 element, a transition metal, a rare earth element or combinations thereof, excluding Si), and the like, and further, may be used in combination of at least one thereof and $SiO_2$. The element M may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po or combinations thereof.

The transition metal oxide may include vanadium oxide, lithium vanadium oxide, and the like.

The anode active material layer may also include a binder, and selectively, may further include a conductive material.

The binder serves to excellently attach anode active material particles to each other, and excellently attach the anode active material to a current collector. Representative examples of the binder may include polyvinyl alcohol, carboxymethyl cellulose, hydroxypropyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like. However, the present disclosure is not limited to the above-described binders.

The conductive material is used to provide conductivity to the electrodes. As the conductive material, any electro-conductive material may be used as long as chemical changes do not occur in a battery to be configured. Examples of the conductive material may include carbon-based materials such as natural graphite, artificial graphite, carbon black, acetylene black, Ketjen black, carbon fibers, and the like; metal-based materials such as metal powder and metal fibers, including copper, nickel, aluminum, silver, and the like; conductive polymers such as polyphenylene derivatives, and the like; or conductive materials including mixtures thereof.

The collector may be a copper foil, a nickel foil, a stainless steel foil, a titanium foil, a nickel foam, a copper foam, a polymer substrate coated with conductive metals, or combinations thereof.

The cathode and the anode are manufactured by mixing each active material, conductive material, and a binder in a solvent to prepare each active material composition, and applying the composition on a current collector. Since the methods of manufacturing electrodes as described above are widely known in the art, detailed description thereof is omitted in the present disclosure. The solvent may be N-methylpyrrolidone, and the like, but the present disclosure is not limited thereto.

The electrolyte charged in the lithium secondary battery may be a non-aqueous electrolyte, a known solid electrolyte, or the like, or may contain lithium salt dissolved therein. Examples of solvents of the non-aqueous electrolyte may include cyclic carbonates such as ethylene carbonate, diethylene carbonate, propylene carbonate, butylene carbonate, vinylene carbonate, and the like; chain carbonates such as dimethyl carbonate, ethyl methyl carbonate, diethyl carbonate, and the like; esters such as methyl acetate, ethyl acetate, propyl acetate, methyl propionate, ethyl propionate, γ-butyrolactone, and the like; ethers such as 1,2-dimethoxyethane, 1,2-diethoxyethane, tetrahydrofuran, 1,2-dioxane, 2-methyltetrahydrofuran, and the like; nitriles such as acetonitrile, and the like; amides such as dimethylformamide, and the like. However, the present disclosure is not limited to the above-described solvents of the non-aqueous electrolyte. The solvent of the non-aqueous electrolyte may be used alone or in combination of a plurality of these solvents. In particular, a mixed solvent in which the cyclic carbonate and the chain carbonate are mixed, may be used.

In addition, the electrolyte may be a gel polymer electrolyte in which a polymeric electrolyte such as polyethylene oxide, polyacrylonitrile, or the like, impregnated with an electrolytic solution or may be an inorganic solid electrolyte such as LiI, Li$_3$N, or the like. However, the present disclosure is not limited to the above-described electrolytes.

Here, the lithium salt may be selected from the group consisting of LiPF$_6$, LiBF$_4$, LiSbF$_6$, LiAsF$_6$, LiClO$_4$, LiCF$_3$SO$_3$, Li(CF$_3$SO$_2$)$_2$N, LiC$_4$F$_9$SO$_3$, LiSbF$_6$, LiAlO$_4$, LiAlO$_2$, LiAlCl$_4$, LiCl and LiI. However, the present disclosure is not limited to the above-described lithium salts.

A separator may be present between the cathode and the anode depending on types of a lithium secondary battery. The separator may be a single layer film of polyethylene, polypropylene, polyvinylidene fluoride, or a multilayer film having two or more layers thereof. In addition, the separator may be a complex multilayer film, such as a two-layered separator of polyethylene/polypropylene, a three-layered separator of polyethylene/polypropylene/polyethylene, or a three-layered separator of polypropylene/polyethylene/polypropylene.

The lithium secondary battery may be classified into a lithium ion battery, a lithium ion polymer battery, and a lithium polymer battery according to kinds of the separator and the electrolyte to be used, or may be classified into a cylindrical shape, a prismatic shape, a coin-type shape, a pouch-type shape, and the like, according to shape, or may be classified into a bulk type and a thin film type according to size. Since structures of these batteries and methods of manufacturing the batteries are widely known in the art, detailed description thereof is omitted in the present disclosure.

Hereinafter, a configuration and a method for implementing objects of the present disclosure are described through the following Examples in more detail. However, the scope of the present disclosure is not limited to these Examples.

Examples 1 to 8

(1) Cathode

Each cathode was manufactured by including lithium-metal oxide (LiNi$_{0.8}$Co$_{0.1}$Mn$_{0.1}$O$_2$) having a concentration gradient from a central portion (LiNi$_{0.8}$4 Co$_{0.11}$Mn$_{0.05}$O$_2$) up to a surface portion (LiNi$_{0.78}$Co$_{0.10}$Mn$_{0.12}$O$_2$) (hereinafter, referred to as CAM-10) as a cathode active material, a mixture of denca black and carbon nanotube (see mixing ratios of Table 2) as conductive materials, and PVDF as a binder, at a mass ratio of 92:5:3. Then, each cathode was coated, dried, and pressed on an aluminum substrate, thereby completing each final cathode.

Concentration gradient of each cathode active material is shown in Table 1 above. For concentration measurement, concentrations of the cathode active material particle were measured at an interval of 5/7 μm from the surface, the cathode active material particle having a distance from the center of the cathode active material up to a surface thereof of 5 μm.

TABLE 1

| Position | Ni(wt %) | Co(w %) | Mn(wt %) |
|---|---|---|---|
| Surface Portion | 77.97 | 10.07 | 11.96 |
| Concentration | 80.98 | 9.73 | 9.29 |
| Gradient | 82.68 | 10.32 | 7 |
|  | 82.6 | 10 | 7.4 |
|  | 82.55 | 10.37 | 7.07 |
|  | 83.24 | 10.86 | 5.9 |
| Central Portion | 84.33 | 10.83 | 4.84 |

(2) Anode

Each anode was manufactured by preparing an anode mixture including 93 wt % of natural graphite as an anode active material, 5 wt % of KS6 which is a flake type conductive material as a conductive material, 1 wt % of SBR as a binder, and 1 wt % of CMC as a thickener, and coating, drying, and pressing the prepared anode mixture on a copper substrate.

(3) Battery

Each battery was manufactured by stacking a cathode plate and an anode plate each having an appropriate size and being notched and interposing a separator (polyethylene having a thickness of 25 μm) between the cathode plate and the anode plate. Then, welding was performed on each tab portion of the cathode and the anode. The welded cathode/separator/anode was put into a pouch, and sealing was performed on three sides except for a side in which the electrolyte is injected. Here, the tap portions were included in the sealing portions. The electrolyte was injected into the remaining side, and the remaining side was sealed, followed by impregnation for 12 hours or more. The electrolyte was prepared by making 1M LiPF$_6$ solution with a mixed solvent of EC/EMC/DEC (25/45/30 by volume), and adding 1 wt % of vinylene carbonate (VC), 0.5 wt % of 1, 3-propene sultone (PRS), and 0.5 wt % of lithium bis(oxalate)borate (LiBOB) thereto.

Then, pre-charging was performed at a current (2.5 A) corresponding to 0.25 C for 36 minutes. After 1 hour, degassing was performed, followed by aging for 24 hours or more, and formation charging and discharging (charging condition CC-CV 0.2 C 4.2V 0.05 C CUT-OFF, discharging condition CC 0.2 C 2.5V CUT-OFF), Then, standard charging and discharging was performed (charging condition CC-CV 0.5 C 4.2V 0.05 C CUT-OFF, discharging condition CC 0.5 C 2.5V CUT-OFF).

Comparative Examples 1 to 8

Each battery was manufactured by the same method as Examples 1 to 8 except for using LiNi$_{0.8}$Co$_{0.1}$Mn$_{0.1}$O$_2$ (hereinafter, referred to as NCM811) having uniform composition in the entire particle, instead of using CAM-10, as the cathode active material.

Comparative Examples 9 to 12

Each battery was manufactured by the same method as Example 1 except for using each cathode active material and each conductive material as described in Table 2 below.

Evaluation

1. Output Characteristic

Output characteristic of each battery manufactured by Examples and Comparative Examples was measured by HPPC (Hybrid Pulse Power Characterization) test by Freedom Car Battery Test Manual. Results thereof were shown in Table 2 below.

2. Low Temperature Characteristic (Discharge Capacity at 20° C. as Compared to Discharge Capacity at Room Temperature)

Low temperature characteristic of each battery manufactured by Examples and Comparative Examples was measured by comparison between discharge capacity at room temperature (25° C.) and discharge capacity at −20° C. (0.5 C charged and 0.5 C discharged). Results thereof were shown in Table 2 below.

TABLE 2

| | Cathode Active Material | Conductive Material 1 | Conductive Material 1 (wt %) | Conductive Material 2 | Conductive Material 2 (wt %) | Output (W/kg) | Low Temperature Characteristic (discharge capacity at −20° C. as compared to discharge capacity at room temperature) (%) |
|---|---|---|---|---|---|---|---|
| Comparative Example 1 | NCM811 | Denca black | 4.9 | CNT | 0.1 | 3000 | 70 |
| Comparative Example 2 | NCM811 | Denca black | 4.75 | CNT | 0.25 | 3025 | 73 |
| Comparative Example 3 | NCM811 | Denca black | 4.5 | CNT | 0.5 | 3050 | 75 |
| Comparative Example 4 | NCM811 | Denca black | 4 | CNT | 1 | 3100 | 78 |
| Comparative Example 5 | NCM811 | Denca black | 3 | CNT | 2 | 3200 | 80 |
| Comparative Example 6 | NCM811 | Denca black | 2 | CNT | 3 | 3200 | 79 |
| Comparative Example 7 | NCM811 | Denca black | 1 | CNT | 4 | 3150 | 75 |
| Comparative Example 8 | NCM811 | Denca black | 0.1 | CNT | 4.9 | 3100 | 72 |
| Example 1 | CAM-10 | Denca black | 4.9 | CNT | 0.1 | 2800 | 60 |
| Example 2 | CAM-10 | Denca black | 4.75 | CNT | 0.25 | 3100 | 65 |
| Example 3 | CAM-10 | Denca black | 4.5 | CNT | 0.5 | 3120 | 72 |
| Example 4 | CAM-10 | Denca black | 4 | CNT | 1 | 3200 | 76 |
| Example 5 | CAM-10 | Denca black | 3 | CNT | 2 | 3300 | 80 |
| Example 6 | CAM-10 | Denca black | 2 | CNT | 3 | 3300 | 75 |
| Example 7 | CAM-10 | Denca black | 1 | CNT | 4 | 3150 | 70 |
| Example 8 | CAM-10 | Denca black | 0.1 | CNT | 4.9 | 3100 | 65 |

It could be appreciated from Table 2 that the batteries of Examples had excellent output characteristic and low temperature characteristic (discharge capacity at −20° C. as compared to discharge capacity at room temperature) as compared to the batteries of Comparative Examples.

Specifically, it could be confirmed that in the cathode active material having the concentration gradient according to the present disclosure and the predetermined mixing ratio of denca black and carbon nanotube (CNT) (ranging from 4.75:0.25 to 3:2), the batteries of Examples had relatively excellent output characteristic and low temperature characteristic as compared to the batteries of Comparative Examples. Specifically, it could be appreciated that as the content of CNT in the ratio of denca black and CNT increased, the batteries of Comparative Examples had output characteristic improved by about 200 Wh/kg (3000→3200 Wh/kg); meanwhile, the batteries of Examples had output characteristic improved by about 400 Wh/kg (2800→3200 Wh/kg), such that the increase in output characteristic of Examples was larger than that of Comparative Examples. In addition, it could be confirmed that improvement extent in view of low temperature characteristic of Examples was also larger than that of Comparative Examples. When the mixing ratio of denca black and carbon nanotube (CNT) was over than a predetermined ratio (a case in which the mixing ratio was over 3:2 in the present result), the output characteristic and the low temperature characteristic were rather deteriorated, which is resulted from failure of effective contact between the conductive materials and the active material. It may be appreciated that when the tube-shaped CNT and denca black which is a spherical nanoparticle are mixed at an appropriate ratio according to the present disclosure, connection between the active materials are excellently achieved to favorably form a conductive path, wherein if any one of CNT and denca black has an excessively larger content than the other one, a relatively large amount of pores occur, which deteriorates conductivity.

The above description of the present disclosure is provided for illustrative purposes, and it will be understood by those skilled in the art that the exemplary embodiments can be easily modified into various forms without changing the technical spirit or essential features of the present disclosure. Accordingly, the exemplary embodiments described herein are provided by way of example only in all aspects and should not be construed as being limited thereto.

The invention claimed is:

1. A secondary battery comprising:
    a conductive material mixture including a linear shape conductive material mixed with a spherical shape conductive material;
    wherein the content of the spherical shape conductive material is higher than the content of the linear shape conductive material; and
    a cathode active material of the following formula:

$Li_xM1_aM2_bM3_cO_y$ wherein M1, M2 and M3 are at least one selected from the group consisting of Ni, Co, Mn, Na, Mg, Ca, Ti, V, Cr, Cu, Zn, Ge, Sr, Ag, Ba, Zr, Nb, Mo, Al, Ga and B,
    wherein x, y, a, b, and c satisfy the relationships

$0 < x \leq 1.1, 2 \leq y \leq 2.02, 0 \leq a \leq 1, 0 \leq b \leq 1, 0 \leq c \leq 1, 0 < a+b+c \leq 1$ wherein at least one of the M1, M2, and M3 has a continuous concentration gradient region from a central portion up to a surface portion of a cathode active material particle formed by the cathode active material, wherein the concentration difference of the M1 between the central portion and a region extended from 5/7 μm radius from the central portion is lower than the concentration difference of the M1 between the surface portion and a region extended from 5/7 μm radius from the surface portion, and wherein the spherical shape conductive material and the linear shape conductive material are mixed at a mixing ratio of the spherical shape conductive material over the linear shape conductive material of 4:1 to 3:2.

2. The secondary battery of claim 1, wherein the linear shape conductive material is a carbon nanotube.

3. The secondary battery of claim 1, wherein the spherical shape conductive material is a carbon black.

4. The secondary battery of claim 1, wherein at least one of the M1, M2, and M3 has a concentration gradient region in which a concentration is increased from the central portion up to the surface portion, and the remainder has a concentration gradient region in which a concentration is decreased from the central portion up to the surface portion.

5. The secondary battery of claim 1, wherein any one of the M1, M2, and M3 has a predetermined concentration from the central portion up to the surface portion, and another one has a concentration gradient region in which a concentration is increased from the central portion up to the surface portion, and the other one has a concentration gradient region in which a concentration is decreased from the central portion up to the surface portion.

6. The secondary battery of claim 1, wherein the M1 is Ni, the M2 is Mn, and the M3 is Co.

7. The secondary battery of claim 1, wherein the M1 is Ni, and $0.6 \leq a \leq 0.95$ and $0.05 \leq b+c \leq 0.4$ are satisfied.

8. The secondary battery of claim 1, wherein the M1 is Ni, and $0.7 \leq a \leq 0.9$ and $0.1 \leq b+c \leq 0.3$ are satisfied.

9. The secondary battery of claim 1, wherein the conductive material mixture has a content of 2 to 8 wt % relative to 100 wt % of the cathode active material.

10. The secondary battery of claim 1,
wherein the central portion has a radius of 0.1 μm to 0.2 μm from the center of the cathode active material particle, and
wherein the surface portion has a radius of 0.1 to 0.2 μm from the outermost of the cathode active material particle.

11. A secondary battery comprising:
a conductive material including a spherical shape conductive material and a linear shape conductive material, wherein the content of the spherical shape conductive material is higher than the content of the linear shape conductive material; and
a cathode active material of the formula $Li_xM1_aM2_bM3_cO_y$ wherein M1, M2 and M3 are at least one selected from the group consisting of Ni, Co, Mn, Na, Mg, Ca, Ti, V, Cr, Cu, Zn, Ge, Sr, Ag, Ba, Zr, Nb, Mo, Al, Ga and B, wherein x, y, a, b, and c satisfy the relationships $0<x \leq 1.1$, $2 \leq y \leq 2.02$, $0 \leq a \leq 1$, $0 \leq b \leq 1$, $0 \leq c \leq 1$, $0<a+b+c \leq 1$, wherein a first one of the M1, M2, and M3 has a constant concentration from a central portion to a surface portion of a cathode active material particle formed by the cathode active material, a second one of the M1, M2, and M3 has an increasing concentration gradient region from the central portion to the surface portion of the cathode active material particle, and a third one of the M1, M2, and M3 has an increasing concentration gradient region form the central portion to the surface portion of the cathode active material particle, wherein the central portion of the cathode active material particle has a radius of 0.1 to 0.2 μm from the center of the cathode active material particle, and the surface portion of the cathode active material particle has a radius of 0.1 to 0.2 μm from the outermost surface of the cathode active material particle, and wherein the conductive material includes the spherical shape conductive material and the linear shape conductive material mixed at a mixing ratio of the spherical shape conductive material over the linear shape conductive material of 4:1 to 3:2.

12. The secondary battery of claim 11, wherein the M1, M2, and M3 are selected form the group consisting of Ni, Co, and Mn.

13. The secondary battery of claim 11, wherein the M1 is Ni, the M2 is Mn, and the M3 is Co.

14. The secondary battery of claim 11, wherein the concentration difference of the M1 between the central portion and a region extended 5/7 μm radius from the central portion is lower than the concentration difference of the M1 between the surface portion and a region extended 5/7 μm radius from the surface portion.

* * * * *

UNITED STATES PATENT AND TRADEMARK OFFICE
CERTIFICATE OF CORRECTION

PATENT NO. : 10,840,508 B2
APPLICATION NO. : 16/230697
DATED : November 17, 2020
INVENTOR(S) : Jin-Sub Lim et al.

It is certified that error appears in the above-identified patent and that said Letters Patent is hereby corrected as shown below:

In the Claims

Column 12, Line 15, Claim 11 after "concentration", --region-- should be inserted;
Column 12, Line 21, Claim 11 "an increasing" should be changed to --a decreasing--;
Column 12, Line 22, Claim 11 "form" should be changed to --from--; and
Column 12, Line 36, Claim 12 "form" should be changed to --from--.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*